United States Patent [19]

Uchida et al.

[11] Patent Number: 4,984,628
[45] Date of Patent: Jan. 15, 1991

[54] APPARATUS FOR MAINTAINING LIQUID TEMPERATURE AT A CONSTANT LEVEL

[75] Inventors: Hiroyasu Uchida; Tetsuaki Abe; Hiroaki Ishizawa, all of Katsuta, Japan

[73] Assignee: Hitachi, Ltd., Tokyo, Japan

[21] Appl. No.: 375,884

[22] Filed: Jul. 6, 1989

[30] Foreign Application Priority Data

Jul. 9, 1988 [JP] Japan .................................. 63-171652

[51] Int. Cl.$^5$ ............................................ F25B 29/00
[52] U.S. Cl. ........................................ 165/26; 165/30; 165/34; 165/36; 165/35; 165/63; 165/64; 62/185; 62/201; 62/434; 62/435
[58] Field of Search ................. 165/30, 34, 101, 108, 165/26, 35, 36, 63, 64; 62/435, 434, 185, 201

[56] References Cited

U.S. PATENT DOCUMENTS

| | | | |
|---|---|---|---|
| 3,047,274 | 7/1962 | Wilson | 165/101 |
| 3,227,207 | 1/1966 | Litman | 165/30 |
| 3,229,754 | 1/1966 | Hoag | 165/30 |
| 3,370,454 | 2/1968 | Flores | 165/108 |
| 4,072,181 | 2/1978 | Kostura et al. | 165/30 |
| 4,483,823 | 11/1984 | Umetsu et al. | 422/63 |
| 4,526,012 | 7/1985 | Chigira | 62/435 |
| 4,729,424 | 3/1988 | Mizuno et al. | 165/30 |
| 4,784,213 | 11/1988 | Eager et al. | 165/30 |
| 4,798,242 | 1/1989 | Kito et al. | 165/101 |

*Primary Examiner*—John Ford
*Attorney, Agent, or Firm*—Fay, Sharpe, Beall, Fagan, Minnich & McKee

[57] ABSTRACT

An apparatus for maintaining liquid temperature at a constant level comprises a reaction vessel for containing liquid, a cooling device connected with the reaction vessel for cooling the liquid, a heating device connected with the cooling device for heating the liquid cooled by the cooling device, a circulating device for circulating the liquid through and among the reaction vessel, the cooling device and the heating device, a temperature detecting device for detecting the temperature of the liquid heated by the heating device, a heat exchange rate control device for controlling the heat exchange rate between the cooling device and the liquid, and a control device for controlling the heating device and the heat exchange rate control device based on a control state of the apparatus and on the temperature difference between the detected temperature and a desired temperature.

2 Claims, 3 Drawing Sheets

APPARATUS FOR MAINTAINING LIQUID TEMPERATURE AT A CONSTANT LEVEL

BACKGROUND OF THE INVENTION

The present invention relates to an apparatus for maintaining liquid temperature in a vessel at a constant level, and in particular, to an apparatus for maintaining liquid temperature in a reaction vessel of an automatic biochemical analyzer for clinic examination at a constant level.

An automatic biochemical analyzer for clinic examination, require a short rise time for the liquid temperature in the reaction vessel, i.e. a short time length from the start of the power supply to the time when a desired temperature of the liquid has been reached, and a precise control of the liquid temperature at a desired level, i.e. a control including only small temperature ripples.

Automatic biochemical analyzers for clinical examination generally provide a cooling device which is continuously operated for cooling the liquid, and a heating device which is intermittently operated for heating the cooled liquid for maintaining the liquid temperature in a desired temperature range. In this arrangement of the prior art, in order to obtain a short rise time, the cooling device and the heating device are required to have a rather large capacity. However, the large capacities of the cooling and heating devices cause greater temperature ripples. In contrast with this, smaller temperature ripples may be obtained by using cooling and heating devices each having a smaller capacity. However, this arrangement will cause a rather long rise time. Since the above-mentioned two requirements are contradictory to each other, in conventional automatic biochemical analyzers of clinic examination, the capacity of each device is so determined as to obtain a short rise time at the sacrifice of precise liquid temperature control, or to obtain precise liquid temperature control at the sacrifice of a short rise time. Or else, these two contradictory requirements are compromised. In short, no automatic biochemical analyzer for clinic examination of the prior art has satisfied these two requirements at the same time.

In addition, in automatic biochemical analyzers for clinic examination of the prior art, the cooling device is operated to cool the liquid at all times, even when, at the start of the analyzer operation, the liquid temperature is lower than the desired value. In such circumstances of lower initial temperature, it is obvious that the heating operation alone including no cooling operation is more effective to obtain a shorter rise time. Namely, the analyzer of the prior art has a demerit that an unnecessary cooling operation is carried out even in the case of the liquid having a lower initial temperature. Further, since the cooling device is in operation at all times, the refrigerator of the cooling device is always applied on by a maximum load, which causes a shorter life of the refrigerator.

SUMMARY OF THE INVENTION

An object of the present invention is to provide an apparatus for maintaining liquid temperature at a constant level, which can assure a shorter rise time of an automatic analyzer as well as small ripples of the liquid temperature.

Another object of the present invention is to provide an apparatus for maintaining liquid temperature at a constant level, wherein the operation time of the refrigerator at a full load condition can be decreased.

An apparatus for maintaining liquid temperature at a constant level according to the present invention comprises a reaction vessel for containing the liquid, cooling means for cooling the liquid and connected with the reaction vessel, heating means connected with the cooling means for heating the liquid cooled by the cooling means, circulating means for circulating the liquid through and among the reaction vessel, the cooling means and the heating means, temperature detecting means for detecting the temperature of the liquid heated by the heating means, heat exchange rate control means for controlling the heat exchange rate between the cooling means and the liquid, and control means for controlling the heating means and the heat exchange rate control means based on the control state of the apparatus and on the temperature difference between the detected temperature and a desired temperature.

In an embodiment of the present invention, the heat exchange rate control means includes a plurality of cooling tubes disposed in the cooling means for passing the liquid therethrough each having a different heat exchange capacity, and valve means for opening or closing each of passages communicating with each of the cooling tubes.

In another embodiment, the heat exchange rate control means includes a cooling tube disposed in the cooling means and valve means for controlling the liquid flow directed towards the cooling tube.

DESCRIPTION OF THE PREFERRED EMBODIMENTS

Figure 1:
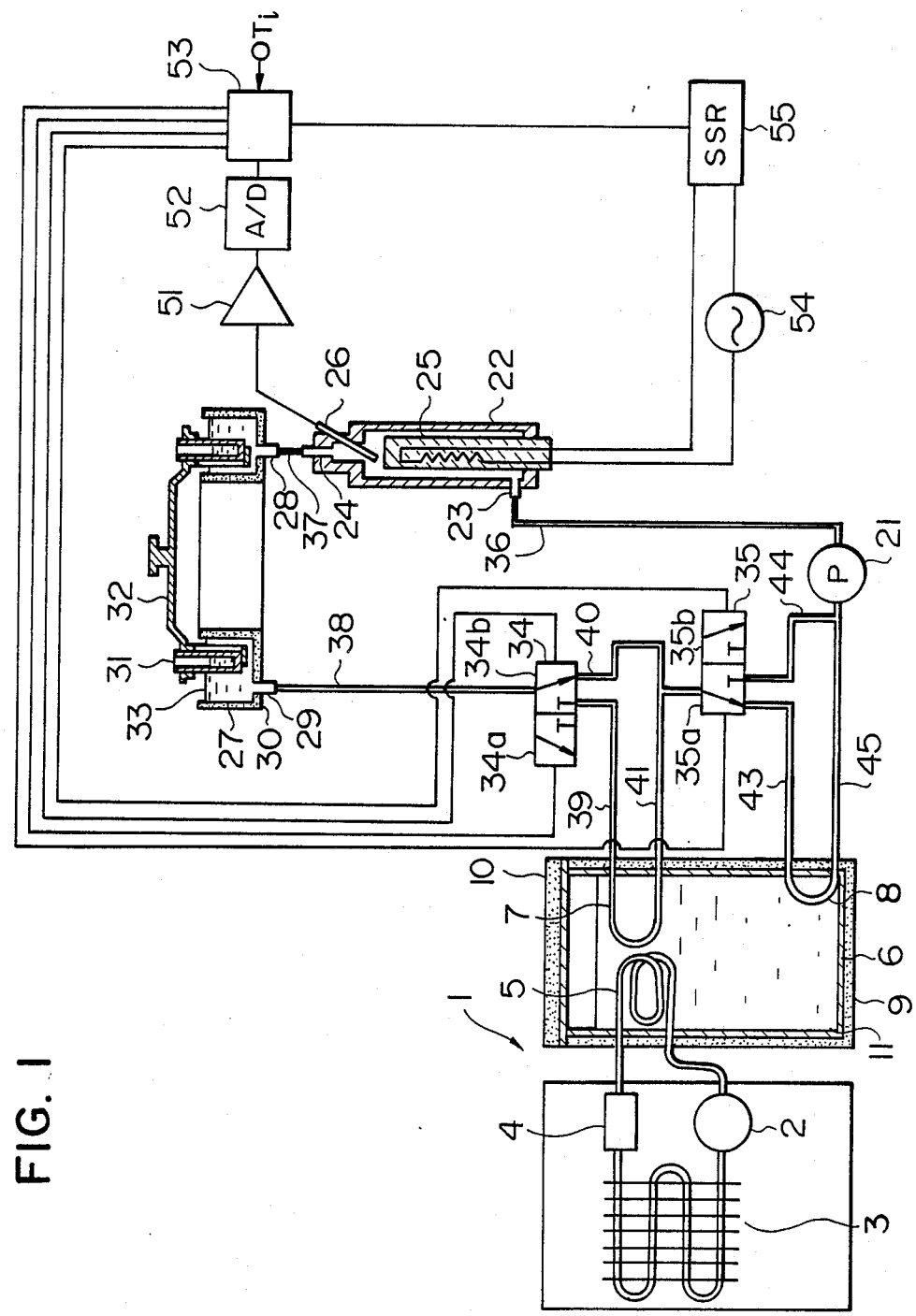
FIG. 1 is a schematic representation of an embodiment of the apparatus for maintaining liquid temperature at a constant level according to the present invention with the heat exchange rate control means in an normal control state.
Figure 2:
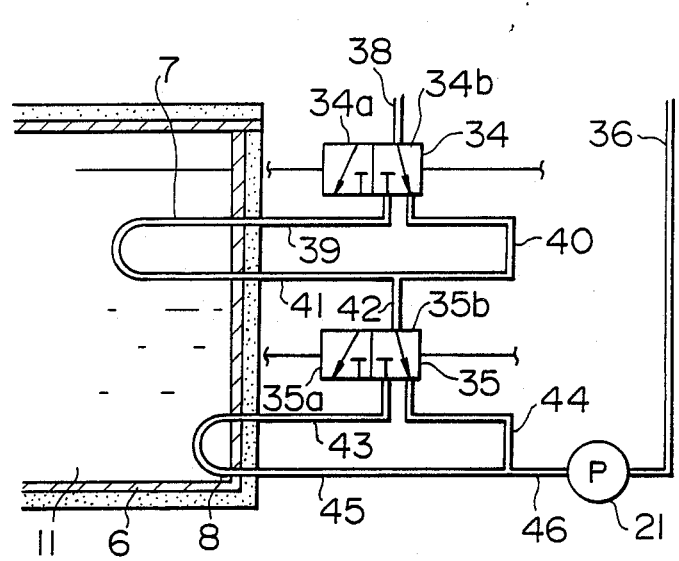
FIG. 2 is a circuit diagram of the heat exchange rate control means shown in FIG. 1 in a starting state of the apparatus wherein the liquid temperature is lower than a desired temperature.
Figure 3:
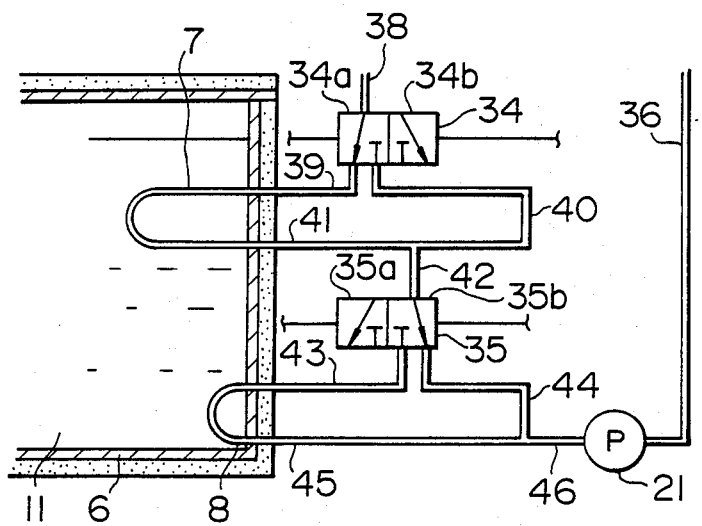
FIG. 3 is a circuit diagram of the heat exchange rate control means shown in FIG. 1 in a starting state of the apparatus wherein the liquid temperature is higher than a desired temperature.

Referring to FIGS. 1, 2 and 3, an apparatus for maintaining liquid temperature at a constant level according to an embodiment of the present invention will be described below. FIG. 1 shows the apparatus applied to an automatic biochemical analyzer for clinic examination. In FIG. 1, liquid 33 is contained in an annular cylindrical reaction vessel 27, which has an U-shaped axial cross-section and an upper opening. The reaction vessel 27 is connected at its bottom with an inlet port 28 and an outlet port 29 for circulating the liquid 33, and coated on its outer surface with insulation material 30. Numeral 31 denotes a cylindrical reaction cell, which is made of transparent material having a good optical feature and a high heat conductivity, such as glass, for example, and poured with a predetermined amount of analite and a predetermined amount of reagent to be mixed with each other. A plurality of reaction cells are supported by a reaction disk 32, and immersed at their lower portions into the temperature controlled liquid 33 in the reaction vessel 27 for maintaining the liquid in the reaction cells at a reaction temperature.

The outlet 29 of reaction vessel 27 is connected with a pipe 38, which is connected with a first switching valve 34. The first switching valve 34 includes an inlet port, a first outlet port and a second outlet port and has two valve positions, i.e. a valve position 34a where the first outlet port is communicated with the inlet port, while the the second outlet port is closed, and a valve position 34b where the second outlet port is communicated with the inlet port, while the first outlet port is closed. The first outlet port of the first switching valve 34 is connected with one end of a first cooling tube 7 through a pipe 39, while the second outlet port is connected with an inlet port of a second switching valve 35 through a pipe 40. The second switching valve 35 includes, similarly to the first switching valve 34, an inlet port, a first outlet port and a second outlet port and has two valve positions, i.e. a valve position 35a where the first outlet port is communicated with the inlet port, while the the second outlet port is closed, and a valve position 35b where the second outlet port is communicated with the inlet port, while the first outlet port is closed. The first outlet port of the second switching valve 35 is connected with one end of a second cooling tube 8 through a pipe 43, while the second outlet port is connected through a pipe 44 with a pump 21 for circulating the liquid 33. The first switching valve 34 and the second switching valve 35 are controlled based on signals from control means 53, which will be described later.

A cooling device 1 is a refrigerator using, for example, Freon gas as refrigerant, and includes a compressor 2, a condenser 3 for condensing the refrigerant, an expansion valve 4 for expanding the refrigerant, an evaporator 5 for evaporating the refrigerant and a cooling water tank 6 containing water 11. The outer surface of the cooling water tank 6 is coated with insulation material 9, and the upper opening of the tank is closed with a cover 10 made of insulation material. The water 11 in the cooling water tank 6 is cooled by utilizing evaporation heat of the refrigerant in the evaporator 5.

The first cooling tube 7 extends in the cooling water tank 6 and then to outside of the tank 6 and is connected at the end, other than the one end of the tube 7, with the pipe 40 through a pipe 41. Similarly, the second cooling tube 8 extends in the cooling water tank 6 and is then to outside of the tank 6 and connected at the end, other than the one end of the tube 8 with the pipe 44 through a pipe 45. The heat exchange capacity of the first cooling tube 7 is determined correspondingly to the maximum cooling capacity of the cooling device 1, while the heat exchange capacity of the second cooling tube 8 is so determined as to suit the normal control state of the apparatus.

The discharge side of the pump 21 is connected through a pipe 36 with an inlet port 23 of a heating device 22, an outlet port 24 of which is connected with the inlet port 28 of the reaction vessel 27 through a pipe 37. The heating device 22 is of a cylindrical shape and includes therein a rod-shaped heater 25 and a temperature sensor 26 for detecting the liquid temperature Tp.

The output signal of the temperature sensor 26 is transformed into an amplified voltage signal through an amplifier 51, and transferred to a A/D converter 52, where the signal is digitized, and then to the control means 53 which includes a micro-computer. The liquid temperature detecting actions of temperature sensor 26 are usually carried out every 20 msec.

Further, there are shown an electric alternating current source 54 for the heater 25, and a solid-state relay 55 which controls the alternating current from the current source 54 in an on-off way based on control signals from the control means 53.

The function of the apparatus will be described below.

The electric power is supplied to the automatic biochemical analyzer for clinic examination, and a desired temperature value Ti is input into the control means 53. The desired temperature Ti is usually selected from among 25° C., 30° C. and 37° C.

In a starting time of the analyzer operation, wherein the temperature Tp of the liquid 33 detected by the temperature sensor 26 is lower than the desired temperature Ti, the control means 53 instructs to energize the heater 25 of the heating device 22, and to switch the first switching valve 34 and the second switching valve 35 to the position 34b and the position 35b, respectively (refer to FIG. 2). In consequence, the liquid 33 in the reaction vessel 27 is flowed through the outlet port 29, the pipe 38, the inlet port of the first switching valve 34, the second outlet port of the first switching valve 34, the inlet port of the second switching valve 35, the second outlet port of the second switching valve 35 to the heating device 22, where the liquid is heated, and then is returned to the reaction vessel 27. In this case, since the liquid 33 is not cooled by the cooling device 1, but only heated by the heater 25, the liquid 33 can be rapidly heated to the desired temperature Ti.

On the other hand, in a starting time of the analyzer operation, wherein the temperature Tp of the liquid 33 detected by the temperature sensor 26 is higher than the desired temperature Ti, the control means 53 instructs to deenergize the heater 25 of the heating device 22, and to switch the first switching valve 34 and the second switching valve 35 to the position 34a and the position 35b, respectively (refer to FIG. 3). In consequence, the liquid 33 in the reaction vessel 27 is flowed through the outlet port 29, the pipe 38, the inlet port of the first switching valve 34, the first outlet port of the first switching valve 34, the first cooling tube 7, the pipe 41, the inlet port of the second switching valve 35, the second outlet port of the second switching valve 35 to the heating device 22, and then is returned to the reaction vessel 27. In this case, since the liquid 33 is not heated by the heating device 22 because the heater 25 is deenergized, the liquid 33 can be rapidly cooled to the desired temperature Ti.

After the liquid temperature Tp has reached the desired temperature Ti, the apparatus for maintaining the liquid temperature at a constant level is shifted to a normal control state (FIG. 1). Namely, the control means 53 instructs the first switching valve 34 and the second switching valve 35 to switch to the position 34b and the position 35a, respectively. In consequence, the liquid 33 in the reaction vessel 27 is flowed through the outlet port 29, the pipe 38, the inlet port of the first switching valve 34, the second outlet port of the first switching valve 34, the pipe 40, the inlet port of the second switching valve 35, the first outlet port of the second switching valve 35, the pipe 43, the second cooling tube 8, and the pipe 45, to the heating device 22, where the liquid is suitably heated, and then is returned to the reaction vessel 27. The control means 53 controls the power supply to the heater 25 of the heating device 22 in on-off way based on temperature difference between the desired temperature Ti and the temperature Tp detected by the temperature sensor 26 every 20 msces. In this case, since the liquid 33 is cooled only by the second cooling tube 8 which has a smaller heat exchange capacity selected correspondingly to the normal temperature control state, a temperature control having a high precision and suppressed temperature ripples can be obtained.

Further, since the cooling device 1 is required to run with full load only in a starting time of the analyzer operation, but with minimum load in an operation time of the normal temperature control state, the time duration of which is much longer than the starting time, the life of the cooling device becomes longer.

Figure 4:
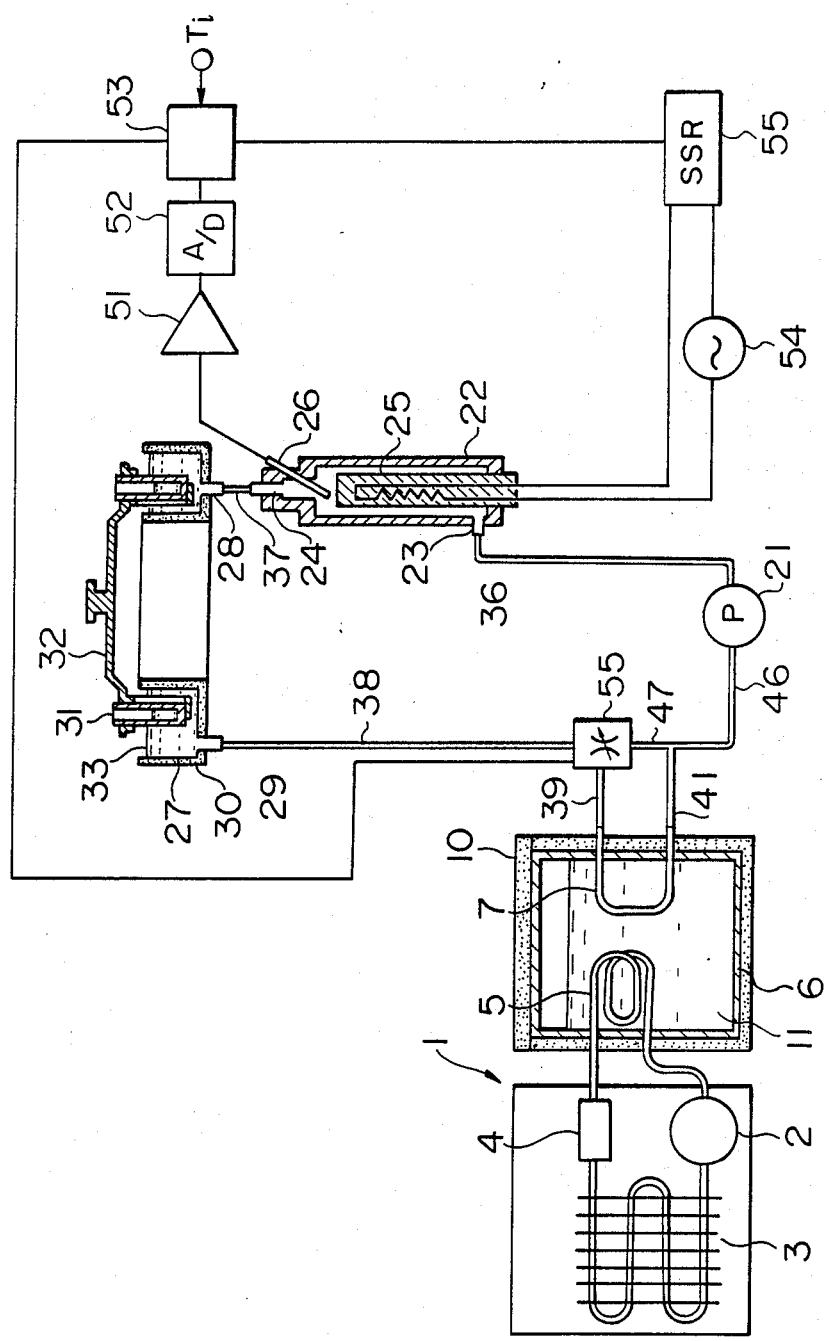
FIG. 4 is a schematic representation of another embodiment of the apparatus according to the present invention.

Another embodiment of the present invention is described below by referring to FIG. 4. Descriptions are shortened with respect to the portions identical with those of the embodiment shown in FIG. 1.

In this embodiment, at the position where the first switching valve 34 is located in the above mentioned first embodiment, a flow dividing valve 55 is instead arranged, and the second switching valve 35 and the second cooling tube 8 are both omitted. The flow dividing valve 55 includes an inlet port connected with the pipe 38, a first outlet port connected with one end of the first cooling tube 7, and a second outlet port connected with the pump 21 through a pipe 47, the other end of the first cooling tube 7 being connected with the pipe 47 through the pipe 41. The flow dividing valve 55 controls the flow rate of the liquid 33 into the first cooling tube 7 based on signals from the control means 53.

In a starting time of the analyzer operation, wherein the temperature Tp of the liquid 33 detected by the temperature sensor 26 is lower than the desired temperature Ti, the control means 53 instructs to energize the heater 25 of the heating device 22, and to control the flow dividing valve 55 so as to prevent the liquid 33 from flowing into the cooling tube 7. In consequence, the liquid 33 in the reaction vessel 27 is flowed through the outlet port 29, the pipe 38, the flow dividing valve 55 and the pipe 47 to the heating device 22, where the liquid is heated, and then returned to the reaction vessel 27. In this case, since the liquid 33 is not cooled by the cooling device 1, but only heated by the heater 25, the liquid 33 can be rapidly heated to the desired temperature Ti.

On the the hand, in a starting time of the analyzer operation, wherein the temperature Tp of the liquid 33 detected by the temperature sensor 26 is higher than the desired temperature Ti, the control means 53 instructs to deenergize the heater 25 of the heating device 22 and to control the flow dividing valve 55 so as to make the whole liquid 33 flow from the pipe 38 into the cooling tube 7. In consequence, the liquid 33 in the reaction vessel 27 is flowed through the outlet port 29, the pipe 38, the flow dividing valve 55, the first cooling tube 7, where the liquid is cooled by the cooling water 11, to the heating device 22, and then returned to the reaction vessel 27. In this case, since the liquid 33 is not heated by the heating device 22 because the heater 25 is deenergized, but cooled by the first cooling tube 7 having maximum cooling capacity, the liquid 33 can be rapidly cooled to the desired temperature Ti.

After the liquid temperature Tp has reached the desired temperature Ti, the operation of the apparatus for maintaining the liquid temperature at a constant level is shifted to a normal control state. Namely, the control means 53 instructs the flow dividing valve 55 to divide the the liquid 33 and to control the flow rate to the first cooling tube 7 by an amount corresponding to the normal control state. In consequence, a certain amount of the liquid 33 corresponding to the normal control state is cooled by the first cooling tube 7, and then joined with the liquid flow from the pipe 47. The joined liquid is then flowed to the heating device 22, where the liquid is suitably heated, and returned to the reaction vessel 27. The control means 53 controls the power supply to the heater 25 of the heating device 22 in on-off way based on the temperature difference between the desired temperature Ti and the liquid temperature Tp detected by the temperature sensor 26 every 20 msec. In this way, a temperature control having suppressed temperature ripples can be obtained.

As described above, in the present invention, in case the liquid 33 is required to be rapidly cooled, a greater cooling capacity is selected, while in case the liquid 33 is not required to be cooled, the liquid 33 is not cooled, and in the normal control state, a suitable cooling capacity corresponding to the normal control state is selected. By virtue of these arrangements and processes, a short rise time of the apparatus and a highly precise control of the temperature can be obtained. In addition, the life of the cooling apparatus becomes longer by virtue of the decreased load on the cooling apparatus.

What is claimed is:

1. An apparatus for maintaining liquid temperature at a constant level, comprising:

a reaction vessel for containing liquid, and having an outlet port, cooling means, including a cooling water tank, for cooling said liquid, heating means for heating the liquid cooled by said cooling means, temperature detecting means for detecting a temperature of the liquid heated by said heating means, heat exchange rate control means for controlling the heat exchange rate between said cooling means and said liquid, including a plurality of cooling tubes extending into said cooling water tank of said cooling means for passing said liquid, each of said tubes having a different heat exchange capacity, and switching valve means for switching liquid passages communicating with said plurality of cooling tubes, circulating means for circulating the liquid among said reaction vessel, said heat exchange rate control means and said heating means, and control means for controlling said heating means and said heat exchange rate control means based on a temperature difference between said detected temperature and a desired temperature.

2. An apparatus for maintaining liquid temperature at a constant level, comprising:

a reaction vessel for containing liquid, and having an outlet port, cooling means, including a cooling water tank, for cooling said liquid, heating means for heating the liquid cooled by said cooling means, temperature detecting means for detecting a temperature of the liquid heated by said heating means, heat exchange rate control means for controlling the heat exchange rate between said cooling means and said liquid, including a plurality of cooling tubes extending into said cooling water tank of said cooling means for passing said liquid, each of said tubes having a different heat exchange capacity, and switching valve means for switching liquid passages communicating with said plurality of cooling tubes, circulating means for circulating the liquid among said reaction vessel, said heat exchange rate control means and said heating means, and control means for controlling said heating means and said heat exchange rate control means based on a temperature difference between said detected temperature and a desired temperature, wherein said plurality of cooling tubes includes:

a first cooling tube having a heat exchange capacity corresponding to a maximum cooling capacity of said cooling means, and a second cooling tube having a heat exchange capacity less than the maximum cooling capacity, and selected correspondingly to a normal control state for the liquid temperature, and wherein said switching valve means includes:

a first switching valve having an inlet port connected with said outlet port of said reaction vessel, a first outlet port connected with one end of said first cooling tube, and a second outlet port, and a second switching valve having an inlet port connected with said second outlet port of said first switching valve and another end of said first cooling tube, a first outlet port connected with one end of said second cooling tube, and a second outlet port connected with said circulating means for circulating the liquid.

* * * * *